United States Patent Office 3,102,132
Patented Aug. 27, 1963

3,102,132
ESTERS OF BENZYLOXYCARBONYLAMINO-
CYANOACETIC ACID AND PROCESS
Noel F. Albertson, East Greenbush, N.Y., assignor to Sterling Drug Inc., New York, N.Y., a corporation of Delaware
No Drawing. Filed Feb. 6, 1961, Ser. No. 87,067
1 Claim. (Cl. 260—465)

This invention relates to compositions of matter known in the art of chemistry as esters of acylaminocyanoacetic acid useful as intermediates for preparing 2-pyrazolin-5-ones and to processes for making the same.

The invention in its composition aspect, resides in the concept of an ester of benzyloxycarbonylaminocyanoacetic acid useful as an intermediate for preparing a 3-amino-4-benzyloxycarbonylamino-2-pyrazolin-5-one having a molecular structure represented by the following formula:

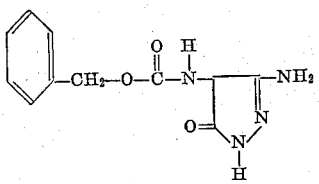

The above compound, which is described and claimed in my copending application, Serial No. 180,917, filed February 23, 1962, which is a divisional application of the instant application, can be prepared by reacting hydrazine, preferably in the form of its hydrate, with an ester of a benzyloxycarbonylaminocyanoacetic acid, thereby to form a 3-amino-4-benzyloxycarbonylamino-2-pyrazolin-5-one.

The phenyl radical in the molecular structure hereinbefore depicted can bear simple substitutents such as nitro, lower-alkyl containing from one to four carbon atoms, halo, trifluoromethyl, and lower-alkylsulfonyl, which we have found do not adversely affect the pharmacological activity of the structure for the above-stated purposes, and which are regarded by me as the whole equivalent of the compound wherein the phenyl ring is unsubstituted.

The compounds can conveniently be prepared by bringing together, for example, ethyl benzyloxycarbonylaminocyanoacetate and hydrazine or hydrazine hydrate in a suitable inert solvent, for example 95 percent ethanol. The reaction takes place at room temperature; but, if desired, the mixture can be warmed to facilitate dissolving the ethyl benzyloxycarbonylaminocyanoacetate.

The physical embodiments of the invention are colorless to light tan crystalline solids which are very slightly soluble in water and are soluble in dilute aqueous solutions of strong bases, for example, potassium hydroxide, sodium hydroxide, ammonium hydroxide, and the like.

The following example serves to illustrate the best method known to the inventor for carrying out the invention.

EXAMPLE

*Ethyl Benzyloxycarbonylaminocyanoacetate*

To a stirred mixture of 88.8 g. (0.625 mole) of ethyl oximinocyanoacetate, 280 ml. of acetic acid, and 1200 g. of ice were added 80.0 g. (1.22 moles) of zinc dust in one portion. Stirring was continued and after ten minutes 85.3 g. (0.5 mole) of carbobenzoxy chloride were added dropwise at a rather rapid rate. After thirty minutes, the product was collected on a filter and was washed with water. The crude yield was 75 percent. After recrystallization from ethyl acetate-hexane, the ethyl benzyloxycarbonylaminocyanoacetate melted at 116.0–116.9° C. (corr.).

*Analysis.*—Calcd. for $C_{13}H_{14}N_2O_4$: N, 10.68; C, 59.52; H, 5.38. Found: N, 10.85; C, 59.56; H, 5.31.

*3-Amino-4-Benzyloxycarbonylamino-2-Pyrazolin-5-One*

To a solution of 13.1 g. (0.05 mole) of ethyl benzyloxycarbonylaminocyanoacetate in 50 ml. of ethanol were added 3.0 g. (0.05 mole) of 85 percent hydrazine hydrate. The product soon began to crystallize. After standing for several days, 10.2 g. of product were collected on a filter and were recrystallized from 50 ml. of acetic acid. The pale tan crystals of 3-amino-4-benzyloxycarbonylamino-2-pyrazolin-5-one melted with decomposition at 217–218° C. (corr.).

*Analysis.*—Calcd. for $C_{11}H_{12}N_4O_3$: C, 53.21; H, 4.87; N, 22.57. Found: C, 53.02; H, 4.81; N, 22.45.

Numerous pyrazolones are known in the art which have utility as analgesics, antipyretics, an antiphlogistic agents. The known pyrazolones which possess this utility contain phenyl, alkyl, or heterocyclic substituents on one or both of the ring nitrogen atoms. According to the instant invention, such substituents are now found not essential for producing active drugs. For example, 3-amino-4-benzyloxycarbonylamino-2-pyrazolin-5-one set forth in the above example has been demonstrated to have analgesic activity in the range of that of aminopyrine by the radiant thermal stimulation test described by N. Ercoli and M. N. Lewis, J. Pharmacol. Exp. Therap., 84, 301 (1945). Thus, when administered intraperitoneally to rats, the threshold dose was 200 mg./kg., and the maximum effect occurred thirty minutes after administration.

Although the ethyl ester of benzyloxycarbonylaminocyanoacetate was used in the above example, it is obvious that other lower alkyl esters of the same acid, for example, the methyl, propyl, and butyl esters, can be used in the same manner.

By replacing carbobenzoxy chloride in the above example with the appropriately-substituted carbobenzoxy chloride, there can be prepared, for example, 3-amino-4-(4'-nitrobenzyloxycarbonylamino)-2-pyrazolin-5-one,
3-amino-4-(4'-methylbenzyloxycarbonylamino)-2-pyrazolin-5-one,
3-amino-4-(4'-bromobenzyloxycarbonylamino)-2-pyrazolin-5-one,
3-amino-4-(2'-chlorobenzyloxycarbonylamino)-2-pyrazolin-5-one,
3-amino-4-(4'-trifluoromethylbenzyloxycarbonylamino)-2-pyrazolin-5-one,
3-amino-4-(4'-methanesulfonylbenzyloxycarbonylamino)-2-pyrazolin-5-one,
3-amino-4-(3',5'-dimethylbenzyloxycarbonylamino)-2-pyrazolin-5-one, 3-amino-4-(2',4'-dichlorobenzyloxycarbonylamino)-2-pyrazolin-5-one,
3-amino-4-(3',4'-dichlorobenzyloxycarbonylamino)-2-pyrazolin-5-one,
3-amino-4-(2'-chloro-4'-nitrobenzyloxycarbonylamino)-2-pyrazolin-5-one, and the like.

I claim:
Ethyl benzyloxycarbonylaminocyanoacetate.

References Cited in the file of this patent

UNITED STATES PATENTS

| | | |
|---|---|---|
| 2,837,558 | Lynn | June 3, 1958 |
| 2,905,694 | Pinson | Sept. 22, 1959 |
| 2,915,549 | Nowak | Dec. 1, 1959 |
| 2,927,928 | Schulze | Mar. 8, 1960 |

FOREIGN PATENTS

| | | |
|---|---|---|
| 133,867 | Sweden | Dec. 11, 1951 |

OTHER REFERENCES

Beilstein: Organische Chemie 1923, Band 6, p. 452. (Copy in Sci. Library.)
Ohta: Chem. Abstracts, vol. 48, column 4440 (1954).
Bentley et al.: Chem. Abstracts, vol. 44, volumn 4902 (1950). Copy available in Patent Office Scientific Library.